Feb. 9, 1960 — O. UFERT — 2,924,151
GEAR-HOBBING MACHINE
Filed Dec. 23, 1953 — 2 Sheets-Sheet 1

INVENTOR
Otto Ufert
By
Patent Agent

Feb. 9, 1960  O. UFERT  2,924,151

GEAR-HOBBING MACHINE

Filed Dec. 23, 1953  2 Sheets-Sheet 2

INVENTOR

Otto Ufert

By
Walter Zulauf
Patent Agent

United States Patent Office 2,924,151
Patented Feb. 9, 1960

2,924,151

GEAR-HOBBING MACHINE

Otto Ufert, Dusseldorf-Oberkassel, Germany, assignor to Schiess Aktiengesellschaft, Dusseldorf-Oberkassel, Germany Application December 23, 1953, Serial No. 399,967

Claims priority, application Germany December 23, 1952

2 Claims. (Cl. 90—4)

The present invention relates to gear-cutting and, more specifically, to gear-hobbing machines.

Gears which have to meet the highest requirement as to precision as, for instance, gears of turbine drives which rotate at high circumferential velocities, have as a rule their teeth cut by gear-hobbing machines. The reason for this consists in that this type of machine has the advantage over all other gear-cutting machines that during the gear-cutting operation, the workpiece as well as the cutting tool in addition to carrying out a very slow and steady feeding movement carry out only rotative movements but no reciprocating movements. This is of greatest importance with regard to the precision of the workpiece to be machined.

One of the most important prerequisites for the proper working of these machines consists in that the cutting tool and the workpiece perform an as synchronous movement as possible because with the least leading or lagging of the cutter movement with regard to the movement of the workpiece, gear-cutting errors will occur which ultimately will make the finished gears run rather noisily. The requirements as to precision are, therefore, frequently so high that already errors of a few arc seconds are considered inadmissible.

The greatest difficulty encountered in the effort to obtain a precisely synchronous movement of gear cutter and workpiece consists in that the workpiece together with the workpiece table offers a relatively uniform resistance during the movement thereof, whereas the gear cutter is periodically subjected to stroke-like greatly changing loads. For, whenever a tooth of the gear cutter enters into the workpiece, the resistance is increased almost instantly and drops or is reduced with the same suddenness when a tooth of the gear cutter leaves the workpiece. In view of these load fluctuations, the cutter spindle, due to the elastic tensioning occurring during the cutting operation, has the tendency periodically to jump forward or to lag depending on which phase of the periodically fluctuating resistance is involved at the respective time. This non-uniformity of the cutter movement is still further increased by the back lash in the cutter gears if such back lash is about to react upon the cutter spindle. This is above all the case if the cutter spindle is driven through the intervention of spur gears, because spur gears are unable to resist a springing forward of the cutter spindle. The braking devices which are frequently as auxiliary equipment associated with cutter spindles reduce this error somewhat but they are, by no means, an ideal means for preventing torsional vibrations of the cutter spindle because not only do they destroy effective driving forces and represent an additional load for the transmission shafts but they also bring about a warming up of the cutter spindle and thus in view of thermal stresses and thermal expansions bring about inaccuracies. Moreover the elastic tensions in the cutter spindle drive are so great that they cannot be sufficiently absorbed or intercepted by normally dimensioned braking means.

Therefore, gear-hobbing machines have been designed so that the drive of the cutter tool is effected through the intervention of a worm wheel mounted on the cutter spindle. In order to prevent an elastic jumping forward of the cutter spindle, there are as a rule two worms provided one of which brings about the drive, whereas the second is under load in axial direction with regard to the first one so that it rests against the oppositely located flanks of the worm wheel teeth and in this way brakes the rotation of the cutter. However, such an arrangement hardly produces more than the same effect obtained when braking cutter spindles driven through the intervention of spur gears.

It is, therefore, an object of the present invention to provide a gear-hobbing machine which will overcome the above mentioned drawbacks.

It is still another object of this invention to provide a gear-hobbing machine which will have a minimum of back lash in the driving elements and in which the driving shafts for the spindle drive will be as short as possible.

It is still another object of this invention to provide a gear-hobbing machine with which the unavoidable errors in the gear elements will only to a very minor effect affect the uniformity of the drive for the gear cutter in order in this way to produce as precise a synchronous movement between gear cutter and workpiece as possible.

A still further object of this invention consists in the provision of a gear-hobbing machine as set forth in the preceding paragraph, in which the uniformity of the movement between workpiece and cutting tool will be assured during the forward as well as the backward movement of these elements without the necessity of employing special means for braking the cutting spindle.

These and other objects and advantages of the invention will appear more clearly from the following specification in connection with the accompanying drawings in which.

*General arrangement*

The gear-hobbing machine according to the present invention in which the cutting tool is driven through the intervention of a worm wheel mounted on the cutting spindle, is characterized by two worms which are arranged opposite each other and simultaneously drive the cutting spindle. The arrangement may be such that the two oppositely located worms mesh with the same worm wheel. In this way a maximum in uniformity is obtained and additionally the conditions are created which make it possible to provide short shafts for the cutter drive. In addition thereto, the bearing for the worm wheel is relieved from the driving tooth pressure so that it can be adjusted with a minimum of back lash. Thus errors in the gearing of the worm wheel are prevented from having any harmful effect. The two worms are advantageously driven from a single shaft through gear trains of the same length. In this way, the elastic deformations in the branches of the cutter drive will be of the same type and of the same magnitude and a steady engagement or contact of the two worms and an even drive of the cutter spindle is assured from both sides.

According to a further development of the invention, the gear trains from the driving shaft to the cutter spindle are arranged symmetrically with regard to the plane passing through the axes of the shaft and spindle.

A further feature of the invention consists in that each of the worms is connected with the drive shaft common to them merely through the intervention of one gear. In this way the gear train is short and the harmful elasticity is reduced to a minimum.

Still another feature of the present invention consists in that the right and left flanks of each of the two worms have different pitch and that both worms are axially as well as radially adjustable with regard to each other so that it is possible to cause both worms to mesh with the worm wheel not only simultaneously but also without back lash.

*Structural arrangement*

Figure 1:
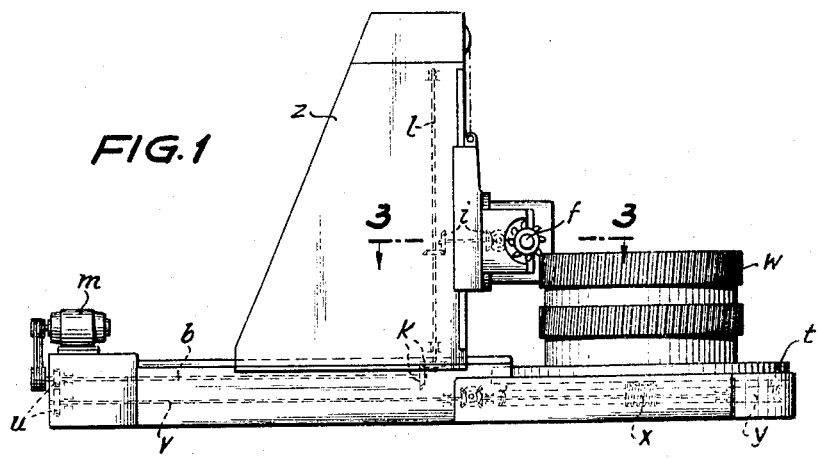
Fig. 1 illustrates a side view of a gear-hobbing machine according to the present invention.
Figure 2:
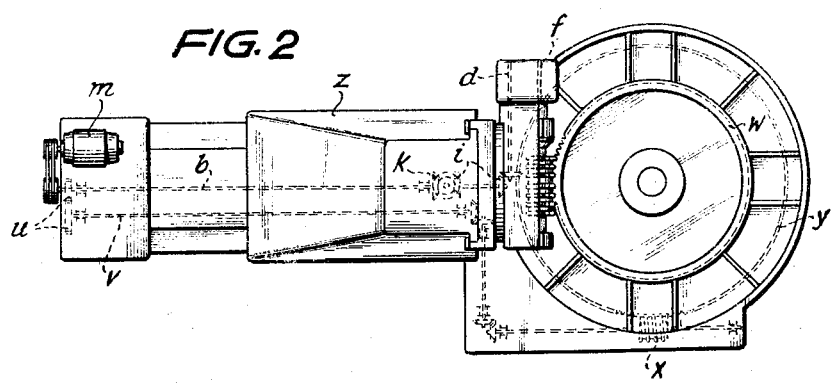
Fig. 2 is a top view of the gear-hobbing machine shown in Fig. 1.
Figure 3:
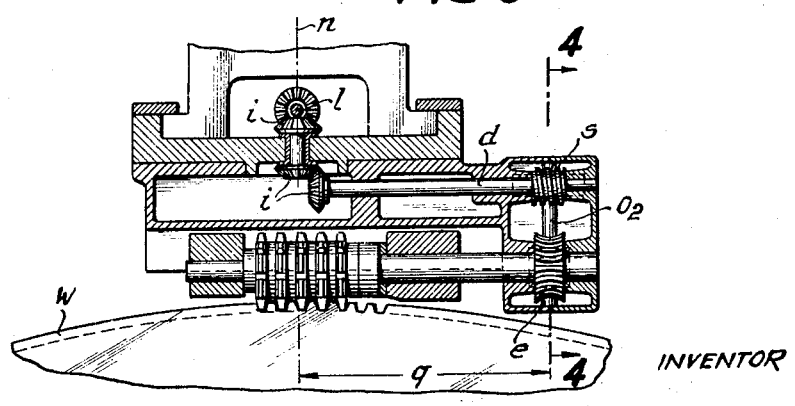
Fig. 3 is a section taken along the line 3—3 of Fig. 1.
Figure 4:
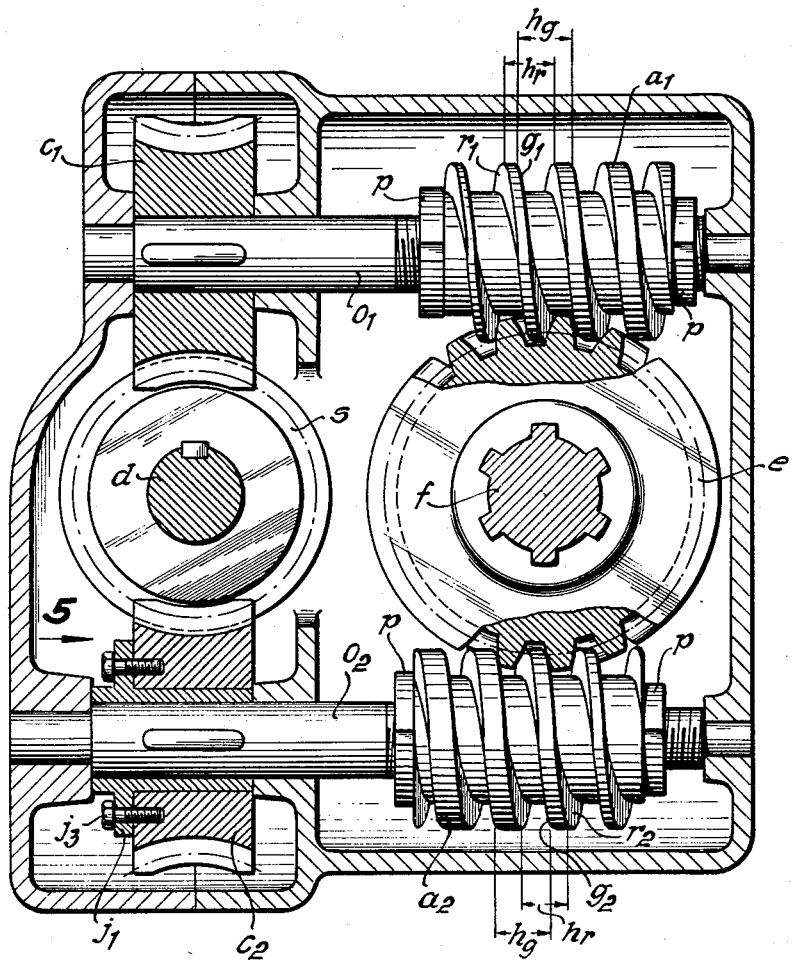
Fig. 4 is a section through the cutter spindle drive taken along the line 4—4 of Fig. 3.

Referring now to the drawings in detail and Figs. 1 and 2 thereof in particular, the workpiece $w$ to be provided with teeth is fastened to the workpiece table $t$ which latter is driven by a variable motor $m$ in a manner known per se through the intervention of the dividing change gears $u$, the dividing shaft $v$, the dividing worm $x$, and the dividing worm wheel $y$. The bevel gears $k$ mounted in the column $z$ of the machine are positively connected through the bed shaft $b$ with the dividing change gears $u$. The said bevel gears $k$ drive a rotational dividing shaft $d$ through a vertical shaft $l$ and bevel gears $i$. Upon this shaft $d$ there is mounted a spiral gear $s$ (Figs. 3 and 4) which simultaneously drives two worm wheels $c-1$ and $c2$ located opposite to each other. Each of these worm wheel gears is adjustably connected with a worm $a-1$, $a2$, and the two worms $a-1$ and $a2$ simultaneously driven by the spiral gear $s$ in their turn simultaneously drive a worm wheel $e$ which is mounted on the cutter spindle $f$ on oppositely located sides of said worms, i.e. symmetrically with regard to the vertical plane pasing through the axes of the shaft $d$ and spindle $f$. This bilateral drive results in a particularly effective increase in the uniformity of the cutter movement because the bearing of the worm wheel $e$ is completely relieved from the tooth pressure on the driving teeth of the worms $a-1$, $a2$, and errors in the gearing of the worm wheel $e$ will have their possible effect upon the cutter spindle $f$ considerably reduced. Since the worm wheel $e$ for conveying the same output can be designed smaller than heretofore necessary, it is also possible to design the distance $q$ of the worm wheel $e$ up to the center line $n$ (Fig. 3) smaller than heretofore customary. This distance is determined by the diameter of the workpiece $w$ and must be of such magnitude that the largest workpiece to be machined on the machine will still pass by the casing of the worm wheel $e$. In view of the reduction of the diameter of the worm wheel $e$ and thus of the distance $q$ as made possible by the invention, also the distance from the worm wheel $e$ up to the cutter center line and the length of the shaft $d$ is reduced which in turn further increases the uniformity of the rotation of the cutter.

Figure 5:
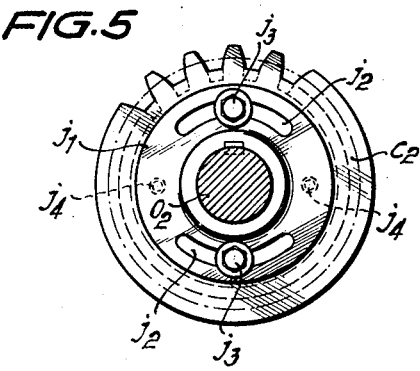
Fig. 5 illustrates an end view of the lower worm wheel shown in Fig. 4 and seen in the direction of the arrow 5.

The flanks $r-1$ and $r2$ of the two worms $a-1$, $a2$ respectively have the pitch $hr$, whereas the flanks $g-1$ and $g2$ of the two worms have a pitch $hg$ differing from the pitch $hr$. In view of the difference between the pitch $hg$ and $hr$, also the thickness of the screw thread of the worms $a-1$ and $a2$ is changed as will clearly be visible from Fig. 4. By axially adjusting the worms on the worm shafts $o-1$, $o2$ by means of nuts $p$, the two worms $a-1$, $a2$ each one by itself can be caused to mesh with the worm wheel $e$ without any back lash. The two worms $a-1$, $a2$ may also be adjusted relative to each other with regard to the rotational position thereof. To this end, through the intervention of an intermediate flange $j-1$ (Figs. 4 and 5) provided with arcuate slots $j2$, the worm wheel $c2$ is connected with the worm $a2$ so that by mere loosening of the connecting screws $j3$ adapted to be screwed into various threaded bores $j4$, each desired rotational position of the worm $a2$ with regard to the worm $a-1$ can be obtained. This double adjustability of the worms $a-1$, $a2$ with regard to their rotational as well as their axial position relative to the worm wheel $e$ is of particular importance in connection with the thickness of the thread portions of the worms which thickness changes in view of the difference between the pitch $hg$ and $hr$, because in this way it is possible without braking devices, brakes or the like to obtain a drive of the worm wheel which is completely free from back lash. Thus, rotational oscillations of the cutter spindle $f$ are intercepted close to the points where such oscillations originate and, therefore, said oscillations are prevented from being conveyed backwards into the transmission.

The length of the kinematic chain from the spiral gear $s$ through the worm wheel $c-1$ to the worm $a-1$ is precisely as short as the length from the spiral gears through the worm wheel $c2$ to the worm $a2$. In this way, there is assured not only a continuously evenly maintained drive of the worm wheel $e$ from both sides thereof in normal direction of rotation of worm wheel $e$, but also in the reverse direction. This is of particular importance when cutting with left-handed cutters because in such an instance it is most frequently necessary to reverse the direction of rotation of the cutter.

The invention is not limited to the particular embodiment shown in the drawing but can also be employed in connection with machines which instead of a radially movable column are provided with a table adjustable radially with regard to the axis of the workpiece. Instead of driving the worms $a-1$, $a2$ through worm wheels $c-1$, $c2$ as indicated in the drawing, said worms $a-1$, $a2$ may also be driven through the intervention of spur gears, bevel gears or hypoid gears. The arrangement according to the present invention may furthermore be supplemented in any desired manner for instance by the provision of fly-wheel masses on the worm shafts $o-1$, $o2$ without, in any way, affecting the present invention.

It is also to be understood that the present invention is, by no means, limited to the arrangements set forth in the preceding description but also comprises any modifications within the scope of the appended claims.

What I claim is:

1. In a gear hobbing machine having a rotatable workpiece supporting table, guiding means for a gear cutter supporting slide, said guiding means being movable toward and away from said table, and a gear cutter supporting slide slidable on said guiding means and including a cutter spindle for supporting and rotating a gear cutter, the combination of: a worm wheel rotatably connected to said cutter spindle, two worms respectively arranged in meshing engagement with said worm wheel and placed diametrically opposite each other, said worms being arranged simultaneously to impart driving force upon said worm wheel in one and the same rotative direction of said worm wheel, means associated with said worms for effecting axial and circumferential adjustment of said worms, the right and left flanks of each of said two worms having a different pitch, and driving means common to said worms and arranged to drive said worms simultaneously to thereby cause both worms to rotate said worm wheel in one and the same direction.

2. In a gear-hobbing machine having a rotatable workpiece supporting table, guiding means for a gear cutter supporting slide, said guiding means being movable toward and away from said table, and a gear cutter supporting slide slidable on said guiding means and including a cutter spindle for supporting and rotating a gear cutter, the combination of: a main worm wheel rotatably connected to said cutter spindle, two worms respectively arranged in meshing engagement with said main worm wheel and placed diametrically opposite each other, the right and left flanks of each of said two worms having a different pitch whereby the thickness of the various turns of the thread of each worm varies, two shafts respectively rotatably supporting said worms, said worms respectively being axially adjustable on said shafts, a pair of auxiliary worm wheels respectively arranged for driving connection with said shafts, each of said auxiliary worm wheels and the respective shaft pertaining thereto being rotatably adjustable relative to each other to thereby bring about a circumferential adjustment of said worms relative to each other, and driving means common to said worms and arranged to drive said worms simultaneously to thereby cause both worms to rotate said main worm wheel in one and the same direction.

References Cited in the file of this patent

UNITED STATES PATENTS

| | | |
|---|---|---|
| 1,105,649 | Grundstein | Aug. 4, 1914 |
| 1,199,601 | Parsons et al. | Sept. 26, 1916 |
| 1,472,848 | Maag | Nov. 6, 1923 |
| 1,504,372 | Parsons et al. | Aug. 12, 1924 |
| 1,603,258 | Zimmermann | Oct. 12, 1926 |

FOREIGN PATENTS

| | | |
|---|---|---|
| 554,596 | Germany | July 14, 1932 |
| 55,184 | France | Apr. 25, 1951 |